(12) United States Patent
Catton (10) Patent No.: US 9,932,126 B2
(45) Date of Patent: Apr. 3, 2018

(54) SYSTEM AND METHOD OF INTEGRITY CHECKING DIGITALLY DISPLAYED DATA

(71) Applicant: GE Aviation Systems Limited, Cheltenham, Gloucestershire (GB)

(72) Inventor: Lewis William Catton, Cheltenham (GB)

(73) Assignee: GE AVIATION SYSTEMS LIMITED (GB)

( * ) Notice: Subject to any disclaimer, the term of this patent is extended or adjusted under 35 U.S.C. 154(b) by 61 days.

(21) Appl. No.: 14/977,924

(22) Filed: Dec. 22, 2015

(65) Prior Publication Data

US 2016/0185463 A1    Jun. 30, 2016

(30) Foreign Application Priority Data

Dec. 24, 2014    (GB) .................................. 1423166.6

(51) Int. Cl.

| | |
|---|---|
| *B64D 43/00* | (2006.01) |
| *G06K 5/00* | (2006.01) |
| *G09G 5/36* | (2006.01) |
| *G06K 19/06* | (2006.01) |

(52) U.S. Cl.
CPC ............... *B64D 43/00* (2013.01); *G06K 5/00* (2013.01); *G06K 19/06037* (2013.01); *G06K 19/06112* (2013.01); *G09G 5/363* (2013.01); *G09G 2380/04* (2013.01)

(58) Field of Classification Search
CPC ................................ B64D 43/00; G09G 5/363
USPC .................................. 235/454; 1/1; 382/100
See application file for complete search history.

(56) References Cited

U.S. PATENT DOCUMENTS

| | | | |
|---|---|---|---|
| 8,553,146 B2 | 10/2013 | Kennedy | |
| 2004/0017928 A1* | 1/2004 | Herzig ..................... | G06K 5/00 |
| | | | 382/101 |
| 2007/0046670 A1 | 3/2007 | Hedrick et al. | |
| 2014/0175163 A1 | 6/2014 | Tankleff et al. | |
| 2014/0193037 A1 | 7/2014 | Stitzinger et al. | |
| 2016/0132840 A1* | 5/2016 | Bowles .............. | G06Q 30/0278 |
| | | | 705/306 |
| 2016/0301924 A1* | 10/2016 | Tay ....................... | G06K 7/1095 |

FOREIGN PATENT DOCUMENTS

| | | |
|---|---|---|
| EP | 1757906 A2 | 2/2007 |
| EP | 2187336 A2 | 5/2010 |
| WO | 20140175823 A1 | 10/2014 |

OTHER PUBLICATIONS

Unofficial translation of FR Search Report and Written Opinion, dated Dec. 13, 2017, in connection to corresponding FR Application 1562988.

* cited by examiner

*Primary Examiner* — Daniel Hess
(74) *Attorney, Agent, or Firm* — William S. Munnerlyn; GE Global Patent Operation (57) ABSTRACT

System and method of integrity checking digitally displayed data in a display system having a display comprising a pixel array with a viewable area, including rendering a known value into a QR code graphic, generating an image onto the display including drawing the QR code graphic in the viewable area of the pixel array, monitoring the generated image for the drawn QR code graphic and determining the integrity of the drawn graphical information.

6 Claims, 5 Drawing Sheets

SYSTEM AND METHOD OF INTEGRITY CHECKING DIGITALLY DISPLAYED DATA

Contemporary aircraft may include displays for displaying graphical information to a user, which may utilize display monitoring where the integrity of the graphical display is determined by selecting displayed outputs and reverse processing them back into their original input form to be compared against what was inputted to create the output. Active display monitoring is a costly technique.

BRIEF DESCRIPTION OF THE INVENTION

In one embodiment, the invention relates to a method of integrity checking digitally displayed data in a display system having a display comprising a pixel array with a viewable area, including rendering a known value into a QR code graphic, generating an image onto the display including drawing the QR code graphic in the viewable area of the pixel array, monitoring the generated image for the drawn QR code graphic, decoding the drawn QR code graphic to define decoded information comparing the decoded information to the known value used to render the QR code graphic and determine the integrity of the drawn graphical information based on the comparison.

In another embodiment, the invention relates to a display system having a display screen comprising a pixel array with a viewable area, a behavior model outputting data to be drawn, a GPU configured to receive the data and having an output signal that graphically renders the data on the viewable area of the display screen to define a displayed image having a QR code with an encoded value and a display-monitoring unit configured to process the image information and decode the value of the drawn QR code in the displayed image to define decoded information wherein the display-monitoring unit provides the decoded information to the behavior model so that the behavior model can determine the integrity of the drawn graphical information by comparing it to the outputted data to be drawn.

DETAILED DESCRIPTION

Figure 1:
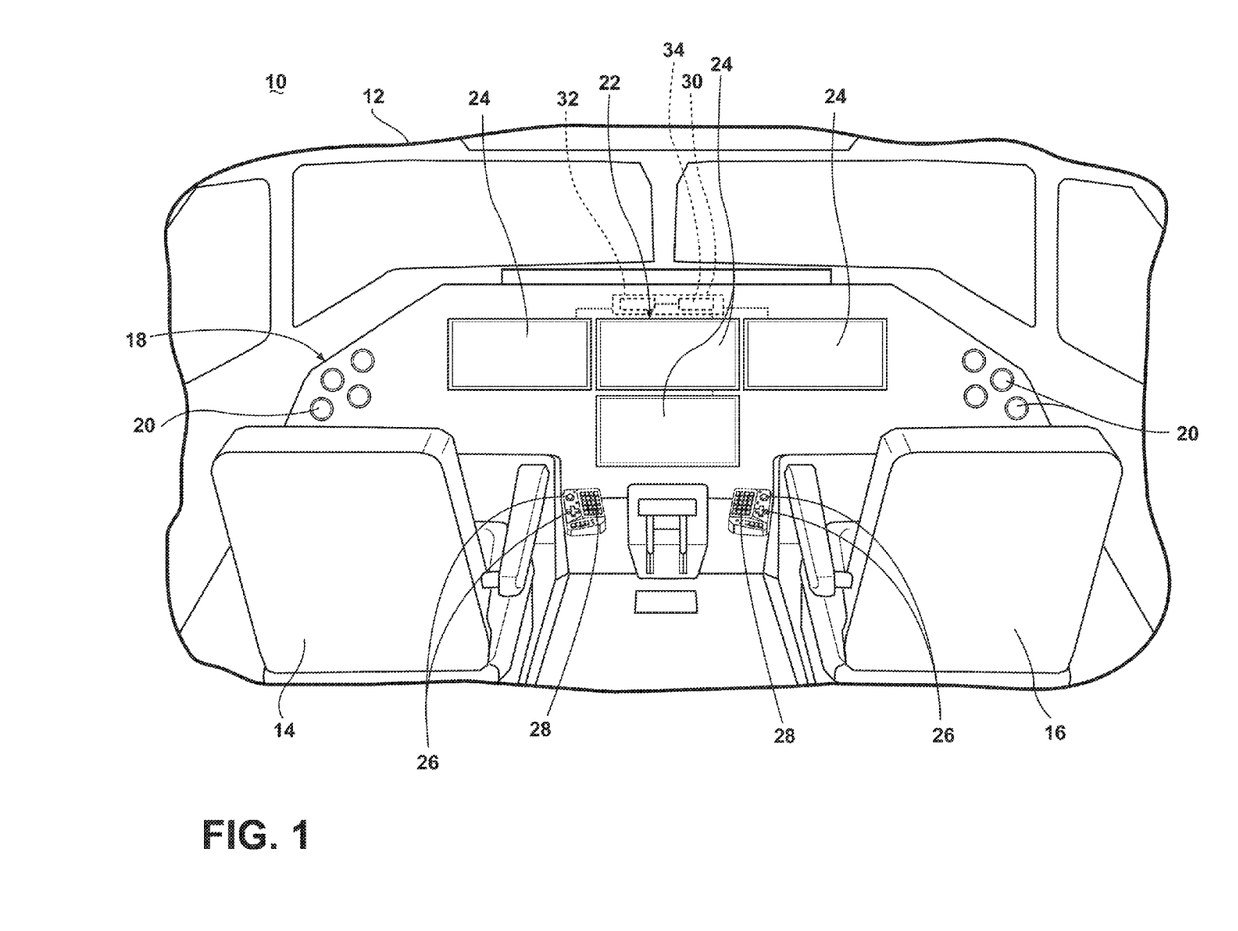
FIG. 1 is a perspective view of a portion of a cockpit including a display system according to an embodiment of the invention.

FIG. 1 illustrates a portion of an aircraft 10 having a cockpit 12. While a commercial aircraft has been illustrated, it is contemplated that embodiments of the invention may be used in any type of legacy aircraft, for example, without limitation, fixed-wing, rotating-wing, rocket, personal aircraft, and military aircraft. A first user (e.g., a pilot) may be present in a seat 14 at the left side of the cockpit 12 and another user (e.g., a co-pilot) may be present at the right side of the cockpit 12 in a seat 16. A flight deck 18 having various instruments 20 and a display system 22, which has been illustrated as having multiple multifunction flight displays with display screens 24 that may be located in front of the pilot and co-pilot and may provide the flight crew with information to aid in flying the aircraft 10.

The flight displays with display screens 24 may include either primary flight displays or multi-function displays and may display a wide range of aircraft, flight, navigation, and other information used in the operation and control of the aircraft 10. The flight displays with display screens 24 may be capable of displaying color graphics and text to a user. The flight displays with display screens 24 may be laid out in any manner including having fewer or more displays and need not be coplanar or the same size. A touch screen display or touch screen surface may be included in the flight display with display screens 24 and may be used by one or more flight crewmembers, including the pilot and co-pilot, to interact with the systems of the aircraft 10. Further, one or more cursor control devices 26, such as a mouse, and one or more multifunction keyboards 28 may be included in the cockpit 12 and may also be used by one or more flight crew members to interact with the systems of the aircraft 10.

A controller 30 may be operably coupled to components of the aircraft 10 including the flight displays with display screens 24, cursor control devices 26, and keyboards 28. The controller 30 may include, among other things, a memory 32, and a processor 34. The memory 32 may include random access memory (RAM), read-only memory (ROM), flash memory, or one or more different types of portable electronic memory, such as discs, DVDs, CD-ROMs, etc., or any suitable combination of these types of memory. The processor 34 may be running any suitable programs to implement a graphical user interface (GUI) and operating system. These programs typically include a device driver that allows the user to perform functions such as selecting options, inputting commands and other data, selecting and opening files, and moving icons. The controller 30 may be a portion of an FMS or may be operably coupled to the FMS.

A computer searchable database of information may be stored in the memory 32 and accessible by processor 34. The processor 34 may run a set of executable instructions to display the database or access the database. Alternatively, the controller 30 may be operably coupled to a database of information. For example, such a database may be stored on an alternative computer or controller. It will be understood that the database may be any suitable database, including a single database having multiple sets of data, multiple discrete databases linked together, or even a simple table of data. The controller 30 may also be connected with other controllers (not shown) of the aircraft 10.

Figure 2:
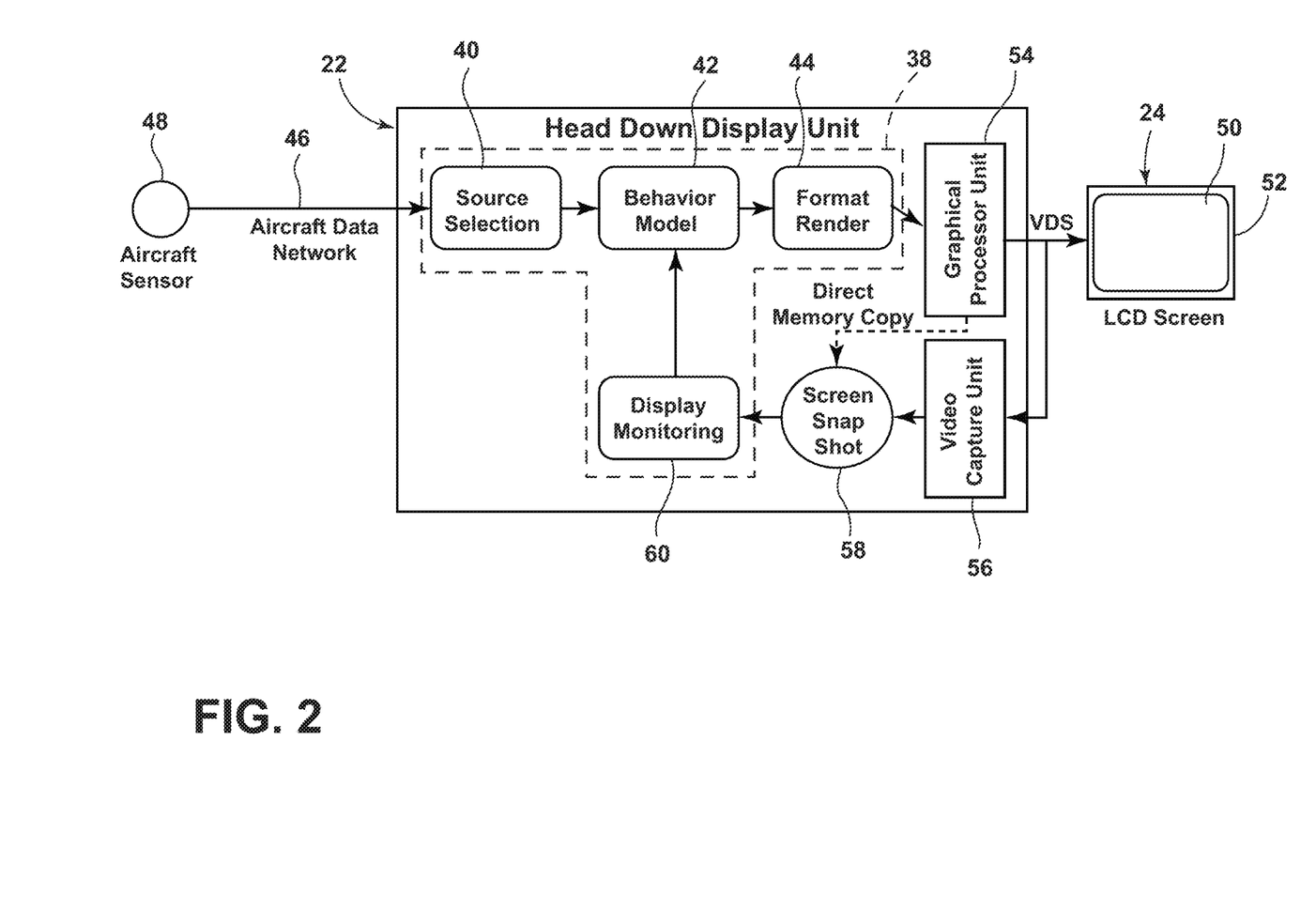
FIG. 2 is a schematic illustration of a display system according to an embodiment of the invention.

FIG. 2 schematically illustrates a display system 22 that may be utilized in the aircraft 10. A microprocessor 38 configured to output data may be included in the display system 22. The microprocessor 38 may be any suitable processor, general or specific designed for the task, including that the microprocessor may be the controller 30 or may be a portion of the controller 30. Among other things, a source selection 40, a behavior model 42, and a format renderer 44 may be included in the microprocessor 38. Aircraft data may be sent to the display system 22 via an aircraft data network 46 or other suitable input. The aircraft data may be from any suitable source including an aircraft sensor 48. The source selection 40 may select the source of the data to be displayed as well as determine all input parameters and their validity from any number of sources. It is also contemplated that the source selection 40 may output a data dictionary. A data dictionary is a collection of <key, value> pairs. A data dictionary facilitates the sharing of data between multiple objects using an API at compile time. In this manner, the contents of the data dictionary may only be known during runtime.

The behavior model 42 may utilize such values in the data dictionary to update its behavior models and generate output to be drawn. The behavior model 42, is an implementation of the business logic used to process the source data and output processed data used by the format renderer 44. For example, this may be achieved using a state machine or software algorithm that models the expected behavior of the various graphical artifacts which are rendered by the format renderer 44. The format renderer 44 contains a graphical model of the artifacts to be rendered. The format renderer 44 updates the model using the processed data output of the behavior model 42. The format renderer 44 converts its model into drawing commands. The graphics processor unit (GPU) 54 renders the drawing commands into a pixel array displayed in the viewable area 50. It will be understood that not all display units will uses a GPU. If a GPU is not used, then the format render 44 may use a software GPU hosted in the microprocessor 38.

The display screen 24 may include a pixel array with a viewable area 50 and an optional non-viewable area 52. A graphics processor unit (GPU) 54 may also be included and the GPU 54 may be configured to receive the outputted data from the microprocessor 38 and graphically render the information on the viewable area 50 of the display screen 24. In this manner, the GPU 54 coverts software commands from the microprocessor 38 into physical pixels on the screen. The GPU 54 may output a whole screen of pixels via a low voltage differential signal (LVDS) to the viewable area 50 of the display screen 24. While the GPU 54 has been illustrated as being separate from the microprocessor 38, it will be understood that alternatively the GPU 54 may be a portion of the microprocessor 38. For example, the GPU 54 may be software on the microprocessor 38.

Further, an optional video capture unit 56 may be included and may be configured to convert the LVDS back into a set of pixels values in memory. Such a video capture unit 56 may include a FPGA (Field-programmable gate array). It is contemplated that the GPU 54 may allow direct access to memory of the GPU 54 and that in such instances a direct copy may be used and a video capture unit is unnecessary. Regardless of whether the video capture unit 56 is utilized, a snap shot of the generated image on the display screen may be captured such as illustrated at 58.

A display-monitoring unit 60 may processes the snap shot of the generated image to make sure that the graphical commands sent to the GPU 54 were actual drawn correctly on the viewable area 50 of the display screen 24. While the display-monitoring unit 60 has been illustrated as being a part of the microprocessor 38, it will be understood that alternatively the display-monitoring unit 60 may be separate. More specifically, if the text "123" is in the snap shot the display-monitoring unit 60 may convert the pixels back into the value "123." The display-monitoring unit 60 may also check the location and rotation of the information. Such information may then be provided to the behavior model 42 for an integrity determination.

During operation, display monitoring may be used by the display system 22 to check that critical aircraft parameters are displayed correctly to the pilot. The display system 22 may use the following render chain, process input/output parameters, process behavior model, and draw the graphics to the display screen 24. In this manner, the microprocessor 38 and GPU 54 produce various graphical displays on the display screen(s) 24. When the application renders graphics it may use a QR code graphic to encode a critical aircraft parameter value into the render image. In this manner, the microprocessor 38 use QR codes to encode information into the finally display image.

The display-monitoring unit 60 looks for the QR code(s) in the image generated by the render pipeline. For example, the display-monitoring unit 60 may include software that looks for data identifying the QR code in the display data and then processes the QR code. More specifically, the display-monitoring unit 60 may look for a start bit and a stop bit for the QR code and every bit of data in between forms the grid for the QR code. Alternatively, the display-monitoring unit looks for a QR code in a pre-defined location, which when decoded specifies where all the other QR codes are. The display-monitoring unit 60 processes the image and decodes the QR code content. For example, the display-monitoring unit 60 may pass the QR code through a decoding software program.

Further, it is contemplated that the QR code graphic may be rotated with the graphics the pilot see. Also, it is contemplated that the QR code may be of varying sizes depending on the encoded data they contain. When the display-monitoring unit 60 finds the QR code graphic it will know the rotational angle and size of the QR code graphic. More specifically, as the display-monitoring unit reads the graphics buffer or LVDS stream the data regarding the QR code may be read to determine the rotational angle, size and location of the QR code graphic. The decoded content and the QR code graphic position, size and rotation may be sent to the behavior model 42, which compares the information to that used to draw on the display 24. If any errors occurred during rendering or transition to the display, it will affect the QR Code graphic in the same way as the graphics the pilots sees. Therefore, errors can be detected. The microprocessor 38 may also be configured to provide an alert regarding a failure of a check.

It will be understood that details of environments that may implement embodiments of the invention are set forth in order to provide a thorough understanding of the technology described herein. It will be evident to one skilled in the art, however, that the embodiments may be practiced without these specific details and in alternative manners. The embodiments are described with reference to the drawings. These drawings illustrate certain details of specific embodiments that implement a module or method, or computer program product described herein. However, the drawings should not be construed as imposing any limitations that may be present in the drawings. The method and computer program product may be provided on any machine-readable media for accomplishing their operations. The embodiments may be implemented using an existing computer processor, or by a special purpose computer processor incorporated for this or another purpose, or by a hardwired system.

As noted above, embodiments described herein may include a computer program product comprising machine-readable media for carrying or having machine-executable instructions or data structures stored thereon. Such machine-readable media may be any available media, which may be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium that may be used to carry or store desired program code in the form of machine-executable instructions or data structures and that may be accessed by a general purpose or special purpose computer or other machine with a processor. When information is transferred or provided over a network or another communication connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data, which cause a general-purpose computer, special purpose computer, or special purpose processing machines to perform a certain function or group of functions.

Embodiments will be described in the general context of method steps that may be implemented in one embodiment by a program product including machine-executable instructions, such as program codes, for example, in the form of program modules executed by machines in networked environments. Generally, program modules include routines, programs, objects, components, data structures, etc. that have the technical effect of performing particular tasks or implement particular abstract data types. Machine-executable instructions, associated data structures, and program modules represent examples of program codes for executing steps of the method disclosed herein. The particular sequence of such executable instructions or associated data structures represent examples of corresponding acts for implementing the functions described in such steps.

Embodiments may also be practiced in distributed computing environments where tasks are performed by local and remote processing devices that are linked (either by hardwired links, wireless links, or by a combination of hardwired or wireless links) through a communication network. In a distributed computing environment, program modules may be located in both local and remote memory storage devices.

Figure 3:
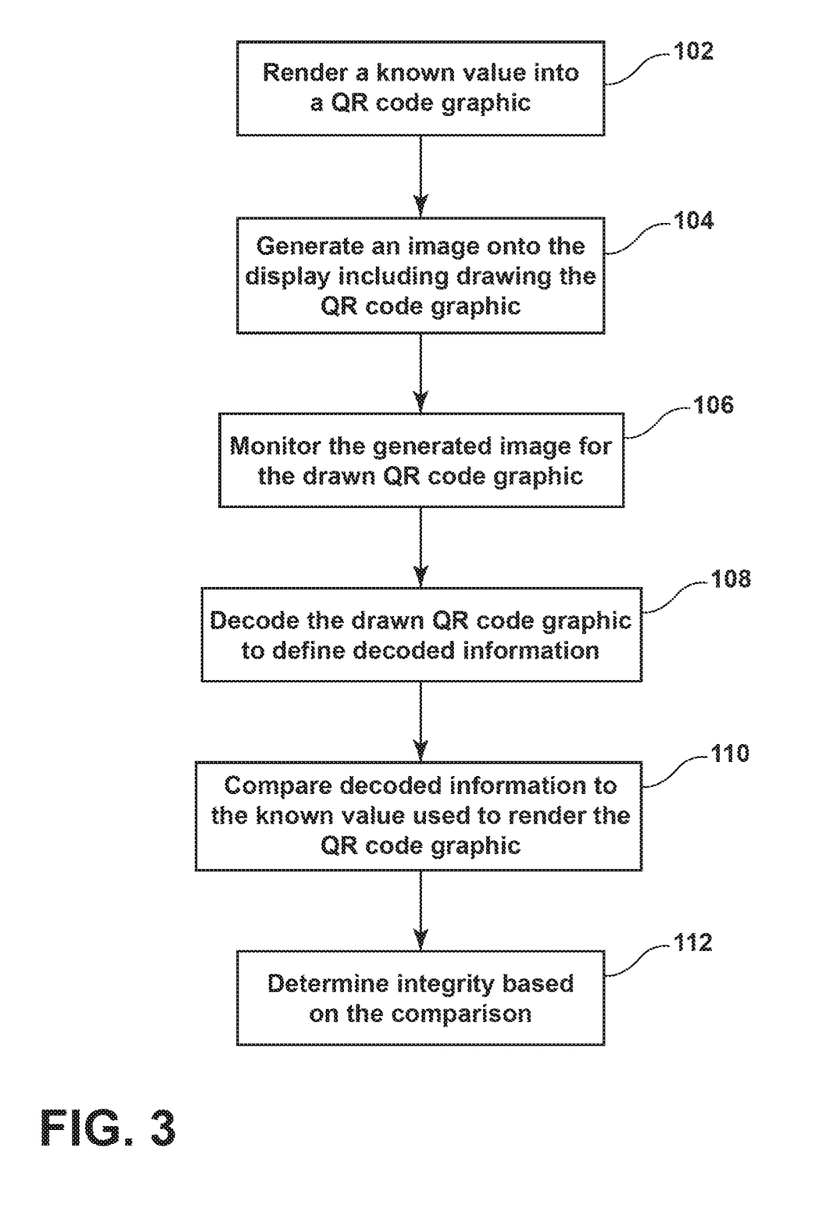
FIG. 3 is a flowchart showing a method of integrity checking data according to an embodiment of the invention.

In accordance with an embodiment of the invention, FIG. 3 illustrates a method 100, which may be used for integrity checking digitally displayed data in a display system, such as the display system 22 or any display system having a display comprising a pixel array with a viewable area. The method 100 begins at 102 by rendering a known value into a QR code graphic. The QR code graphic size is dependent on two elements. The first is the size of each of the modules or squares making up the QR code. If the size of the modules fall below the resolution limit of a camera or other detection system, then the QR code will not be able to be read by the device. The second is the more data you put into a QR code, the more rows and columns of modules will be introduced into the QR code to compensate for the increased data load. As the graphics buffer or LVDS stream is what the display-monitoring unit 60, is reading, conceptually the size of the module can be much smaller than a module read by a camera. In addition, the amount of information stored is very small; therefore, the QR code may be made incredibly small including that a micro QR code may be utilized. By way of non-limiting example, the amount of information may include information such as that listed in Table 1, below.

TABLE 1

| Encoded Values | | | |
|---|---|---|---|
| Number of Units | Decimal Points | Examples | |
| Altitude | 5 | 0 | 50000 ft or 13000 m |
| Speed | 3 | 0 | 999 knots |
| Pitch | 2 | 2 | 90.0 degrees |

It is contemplated that the encoded value may be a critical aircraft parameter or at least a portion of a critical aircraft parameter. By way of non-limiting examples, such critical aircraft parameters may include an altitude, a speed, an attitude, and/or a heading. These parameters are critical to the safety of the aircraft and therefore these parameters should be monitored to make sure that no hazardously misleading information is displayed to the pilot.

At 104, an image may be generated onto the display screen 24 and this may include drawing the QR code graphic in the viewable area of the pixel array. While the QR code may be drawn to the viewable area 50 of the display screen 24, the QR code may be drawn in a manner such that it is not perceivable to the aircrew. For example, as described in more detail below, the QR code may be in the green channel of the display, which is difficult for the human eye to discriminate the small color changes. At 106, the generated image may be monitored for the drawn QR code graphic. For example, in the display system 22, described above, the generated image may be monitored by the display-monitoring unit 60 and/or the microprocessor 38. At 108, the information in the drawn QR code graphic may be decoded, by the display-monitoring unit 60, to define decoded information. The display-monitoring unit 60 may then pass the decoded information to the microprocessor 38 including the behavior model 42. The comparing by the behavior model 42 may also include comparing the displayed position of the QR code graphic to a reference position.

At 110, the decoded information may be compared to the known value used to render the QR code graphic. At 112, the integrity of the drawn graphical information may be determined based on the comparison. In the display system 22, the comparing at 110 and the determining at 112 are done by the behavior model 42 of the microprocessor 38, although any suitable computer may make the comparison.

It will be understood that the method 100 of integrity checking digitally displayed data in a display system is flexible and the method 100 illustrated is merely for illustrative purposes. For example, the sequence of steps depicted is for illustrative purposes only, and is not meant to limit the method 100 in any way, as it is understood that the steps may proceed in a different logical order or additional or intervening steps may be included without detracting from embodiments of the invention. By way of non-limiting example, while the drawing, comparing, and determining has been described as being performed by the microprocessor components, the method may be performed by any suitable combination of hardware and software.

By way of further example, drawing the QR code graphic may include drawing the QR code graphic over the at least a portion of a critical aircraft parameter. This may include a technique used to hide information in the lowest significant bit of a color. This may include drawing the QR code graphic in a green channel of the display. The green channel may be used as it much more difficult for the human eye to discriminate the small color changes. It will be understood that any suitable technique may be used to invisibly encode the QR Code into the final generated image. For example, the RGB values may be manipulated in a different way; choose a different color, number of bits, etc. including that the red or blue channel may be used.

Figure 4:
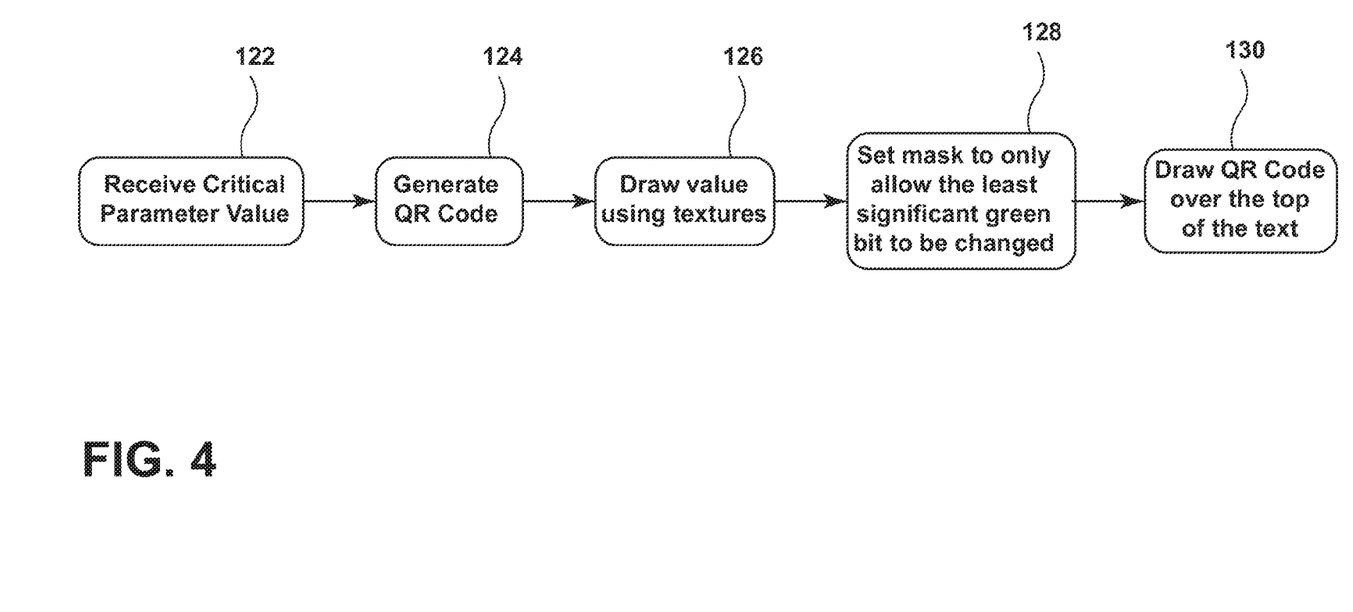
FIG. 4 is a flowchart detailing a portion of the method illustrated in FIG. 3.

It will be understood that a single QR Code graphic or multiple QR code graphics may be used to represent a whole critical parameter value. A method for drawing the text and the QR code graphic is shown in FIG. 4. First, the critical value is received at 120 and the appropriate QR code is generated at 122. The font representing the value is converted to a texture (i.e. a picture), which contains visible characters at 124. To draw the text on the screen the text is broken up into individual characters. Each character is drawn using a rectangle and each rectangle displays the section of texture, which represents that character. In this method, a single QR code may be used to represent the whole critical parameter value. The QR code may be generated each time the value changes. A mask may be set to allow only the least significant green bit to be changed at 126, allowing the QR code to be invisible to the aircrew. The text is drawn using the textures and the QR code is drawn over the top at 128.

Figure 5:
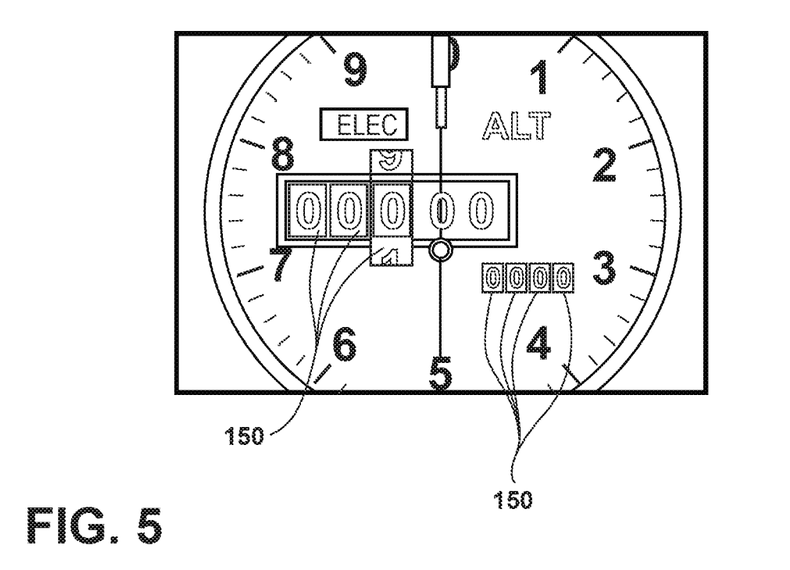
FIG. 5 is a schematic illustration of a portion of an image that may be generated according to the method illustrated in FIG. 3.
Figure 6:
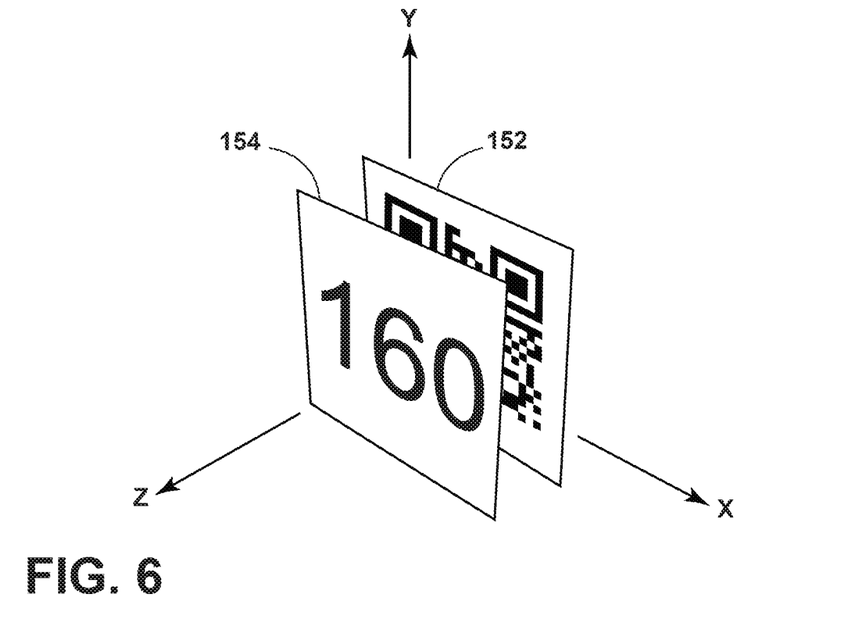
FIG. 6 schematically illustrates layering techniques that may be utilized in generating an image according to the method illustrated in FIG. 3.

In FIG. 5, the values outlined by the rectangles 150 show where textures are being used. From the user's point of view, only the digits will be seen and the QR Code graphic will be hidden because it will be in the green channel of the display, which is difficult for the human eye to discriminate the small color changes. The display-monitoring algorithm looks through the image and extracts just the QR code graphic. FIG. 6 illustrates the layering of the QR code graphic 152 and the drawn text 154. The advantages of having a single QR code graphic for a value is that a large QR Code graphic may be used to cover the whole area of the textured text. Disadvantages include that the QR Code graphic needs to be generated at runtime and the QR Code graphic requires extra render time.

Alternatively, a QR code graphic may be utilized for each character. In such an instance, the QR Code graphic may be inserted into the font texture map. More specifically, each character may contain a QR code graphic with the character's hexadecimal code. This has the advantage that the QR code graphic may be generated once during the offline generating of the final font texture map and during rendering there is no performance increase to draw the QR Code graphics. A disadvantage is that the QR Code graphics need to be small enough not to overlap.

Technical effects of the above-described embodiments include that digitally displayed data may be checked for integrity, which provides a variety of benefits including that the above embodiments facilitate integrity checking of digital display system types that use pixel format displays. Many current display-monitoring solutions are application specific, meaning any changes to the graphics render requires a similar change to the display monitoring. The above-described embodiments allow for the display monitoring to be independent of the graphics render. In this manner, once the display monitoring function has been certified it does not need to be changed and may be reused. Current Display monitoring solutions require the display monitor to be known where the application draws the critical parameters. This allows the display monitor to use image-processing techniques to convert the screen graphics back into the value, which generated. When changes in the application affect the drawing of the critical parameters occur the display monitor needs to be updated match. This means make change is very expensive as the complete system needs to be re-certified. Other techniques require an off-screen area to draw a deterministic pattern, which exercise all the graphical functions used by the application. This does not check the image the pilot sees but checks the off-screen pattern. It is assumed that if an error occurred in the render of the critical parameters then the same error will be seen in the off-screen pattern. This technique requires extra render, which cost processing time and extra memory, as the final image needs to be bigger than the visible area.

The above-described embodiments address all of these issues. Using a QR code means that any information may be encoded. The display monitor will decode the QR code and return the contents back to the application. This allows the display monitor to be independent such that it requires no knowledge of the information it is processing. It also means the display monitor application can be certified once and any application change will leave the display monitoring application unchanged. In addition, the position and rotation of the QR Code can be where the application needs. The display monitor application will report all the QR Codes found in the image with their positions, size and rotations. Unlike current techniques, the above-described embodiments allow an application to send data, such as actual critical aircraft parameters, through the render pipeline and then back to an application for comparison.

To the extent not already described, the different features and structures of the various embodiments may be used in combination with each other as desired. That one feature may not be illustrated in all of the embodiments is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of integrity checking digitally displayed data in a display system having a display comprising a pixel array with a viewable area, the method comprising:
   rendering a known value into a QR code graphic, wherein the known value is at least a portion of a critical aircraft parameter;
   generating an image onto the display including drawing the QR code graphic in the viewable area of the pixel array, wherein a single QR Code graphic is used to represent a whole critical parameter value;
   monitoring the generated image for the drawn QR code graphic;
   decoding the drawn QR code graphic to define decoded information;
   comparing, by a computer, the decoded information to the known value used to render the QR code graphic; and
   determining the integrity of the drawn graphical information based on the comparison.

2. The method of claim 1 wherein the comparing further comprises comparing the displayed position of the QR code graphic to a reference position.

3. The method of claim 1, wherein a character of the critical aircraft parameter contains a QR Code graphic with a hexadecimal code of the character.

4. The method of claim 1, wherein the critical aircraft parameters comprises an altitude, a speed, an attitude, or a heading.

5. The method of claim 1, wherein drawing the QR code graphic comprises drawing the QR code graphic over the at least a portion of a critical aircraft parameter.

6. The method of claim 5, wherein drawing the QR code graphic comprises drawing the QR code graphic in a green channel of the display.

\* \* \* \* \*